United States Patent
Adachi et al.

(10) Patent No.: US 8,837,313 B2
(45) Date of Patent: Sep. 16, 2014

(54) MOBILE COMMUNICATION METHOD AND RADIO TERMINAL

(75) Inventors: Hiroyuki Adachi, Yokohama (JP); Masato Fujishiro, Yokohama (JP); Chiharu Yamazaki, Yokohama (JP); Noriyoshi Fukuta, Yokohama (JP); Atsuhisa Inakoshi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 17 days.

(21) Appl. No.: 13/438,633

(22) Filed: Apr. 3, 2012

(65) Prior Publication Data

US 2012/0257522 A1  Oct. 11, 2012

Related U.S. Application Data (60) Provisional application No. 61/471,336, filed on Apr. 4, 2011.

(51) Int. Cl.
| | |
|---|---|
| *H04L 12/26* | (2006.01) |
| *H04W 52/02* | (2009.01) |
| *H04W 76/04* | (2009.01) |
| *H04W 24/10* | (2009.01) |
| *H04W 76/02* | (2009.01) |
| *H04W 24/00* | (2009.01) |

(52) U.S. Cl.
CPC ............ *H04W 76/048* (2013.01); *H04W 24/10* (2013.01); *H04W 52/0238* (2013.01); *H04W 76/02* (2013.01); *H04W 24/00* (2013.01); *H04W 52/0229* (2013.01)
USPC ........................................................ 370/252

(58) Field of Classification Search
USPC ............................ 370/252, 311, 340; 455/574
See application file for complete search history.

(56) References Cited

U.S. PATENT DOCUMENTS

| | | | | |
|---|---|---|---|---|
| 8,169,957 | B2 * | 5/2012 | Damnjanovic | 370/329 |
| 8,351,922 | B2 * | 1/2013 | Wang et al. | 455/423 |
| 8,432,818 | B2 * | 4/2013 | Cai et al. | 370/252 |
| 8,462,736 | B2 * | 6/2013 | Kazmi et al. | 370/332 |
| 8,509,784 | B2 * | 8/2013 | Masuda et al. | 455/443 |
| 2008/0085710 | A1 * | 4/2008 | Prateek | 455/436 |
| 2010/0142485 | A1 * | 6/2010 | Lee et al. | 370/331 |
| 2012/0033595 | A1 * | 2/2012 | Aoyama et al. | 370/311 |

OTHER PUBLICATIONS

3GPP TS 36.321 V10.0.0 (Dec. 2010); 3rd Generation Partnership Project; Technical Specification Group Radio Access Network; Evolved Universal Terrestrial Radio Access (E-UTRA); Medium Access Control (MAC) protocol specification (Release 10).
3GPP TSG RAN Meeting #51; "LTE RAN Enhancements for Diverse Data Applications" Kansas City, USA, Mar. 15-18, 2011; RP-110454.

* cited by examiner

*Primary Examiner* — Hassan Kizou
*Assistant Examiner* — Abdullahi Ahmed
(74) *Attorney, Agent, or Firm* — Studebaker & Brackett PC (57) ABSTRACT

A mobile communication method, which configures a DRX cycle having an On duration in which a downlink signal transmitted from a serving base station is to be monitored and an Off duration other than the On duration in an RRC connected state where an RRC connection is established between a radio terminal and a radio base station, the mobile communication method comprising: a step A of measuring, at the radio terminal, reception quality of a reference signal transmitted from a cell even in the Off duration when the DRX cycle is configured.

9 Claims, 9 Drawing Sheets

MOBILE COMMUNICATION METHOD AND RADIO TERMINAL

BACKGROUND OF THE INVENTION

1. Field of the Invention

The present invention relates to a mobile communication method, which configures a DRX cycle (a discontinuous reception cycle) having an On duration, in which a downlink signal transmitted from a serving cell is to be monitored, and an Off duration other than the On duration, and a radio terminal.

2. Description of the Related Art

In the next generation communication system such as LTE (Long Term Evolution), in order to reduce the power consumption of a radio terminal, a technology called DRX (Discontinuous Reception) is employed (for example, TS36.321 V10.0.0).

In the DRX, a DRX cycle has an On duration, in which a downlink signal (for example, PDCCH: Physical Downlink Control Channel) transmitted from a serving cell is to be monitored, and an Off duration (Opportunity for DRX) other than the On duration. A radio base station transmits a dedicated signal addressed to a radio terminal only in an On duration of the radio terminal. As described above, the configuration is such that the radio terminal may monitor the downlink signal transmitted from the radio base station, only in the On duration, and may turn off its own receiver in the Off duration. In addition, the DRX cycle may include two cycles (a short DRX cycle and a long DRX cycle). Furthermore, a DRX mode may be configured in the state in which an RRC connection is established between the radio terminal and the radio base station (RRC connected state). That is, it should be noted that the Off duration of the DRX cycle is different from an RRC idle state. In addition, in the 3GPP standard, the long DRX cycle is mandatory and the short DRX cycle is optional.

However, in recent years, there have been increased radio terminals having various applications. The application is configured to periodically transmit and receive a predetermined message such as a keep-alive message or a state update message to/from a communication correspondent such as a server. In such a case, since a control signal is transmitted and received due to the transition toward an RRC state, whenever the predetermined message is transmitted or received, a shortage of a network resource will be caused.

In this regard, in order to suppress the shortage of the network resource, the provision of a DRX cycle (for example, an extended DRX cycle) longer than the existing DRX cycle (for example, the short DRX cycle and the long DRX cycle) (for example, RP-110454) is under consideration.

However, it is assumed that the length of the extended DRX cycle is several seconds or more and the extended DRX cycle is very long as compared with the short DRX cycle, the long DRX cycle and the like. Therefore, the Off duration of the extended DRX cycle is expected to be very long.

Thus, when the extended DRX cycle is configured, various countermeasures are necessary. For example, it is considered that normally, the radio terminal does not measure radio environments of a serving cell and an adjacent cell (hereinafter, referred to as an Intra-Frequency neighboring cell) operated with the same frequency as that of the serving cell in the Off duration, and therefore, if the Off duration is very long, then the radio environments may not be appropriately measured and reported.

SUMMARY OF THE INVENTION

A mobile communication method of a first feature configures a DRX cycle having an On duration in which a downlink signal transmitted from a serving base station is to be monitored and an Off duration other than the On duration in an RRC connected state where an RRC connection is established between a radio terminal and a radio base station. The mobile communication method comprises: a step A of measuring, at the radio terminal, reception quality of a reference signal transmitted from a cell even in the Off duration when the DRX cycle is configured.

In the first feature, the mobile communication method comprises: a step B of measuring, at the radio terminal, reception quality of a reference signal, which is transmitted from a serving cell to which the radio terminal is connected, in the On duration. The radio terminal performs the step A, when the reception quality measured in the step B satisfies a predetermined condition.

In the first feature, the mobile communication method according to claim 1, comprises: a step B of measuring, at the radio terminal, reception quality of a reference signal, which is transmitted from a serving cell to which the radio terminal is connected, in the On duration, reception quality of a reference signal, which is transmitted from an adjacent cell other than the serving cell using a frequency band same as a frequency band of the serving cell, in the On duration, or reception quality of a reference signal, which is transmitted from an adjacent cell other than the serving cell using a frequency band different from a frequency band of the serving cell, in a measurement gap duration configured in the On duration. The radio terminal performs the step A, when the reception quality measured in the step B satisfies a predetermined condition.

In the first feature, the step A comprises: a step of measuring, at the radio terminal, reception quality of a reference signal, which is transmitted from a serving cell to which the radio terminal is connected or an adjacent cell other than the serving cell.

In the first feature, the mobile communication method according to claim 1, comprises: a step C of receiving, at the radio terminal, information indicating a cell which transmits a reference signal to be measured in the Off duration from the radio base station.

In the first feature, a measurement timing of the reception quality of the reference signal in the step A is uniformly assigned in the Off duration.

A radio terminal of a second feature is configured to receive a downlink signal in a mobile communication system, which configures a DRX cycle having an On duration in which the downlink signal transmitted from a serving base station is to be monitored and an Off duration other than the On duration in an RRC connected state where an RRC connection is established between the radio terminal and a radio base station. The radio terminal comprises: a control unit configured to measure reception quality of a reference signal transmitted from a cell even in the Off duration when the DRX cycle is configured.

DETAILED DESCRIPTION OF THE EMBODIMENTS

A mobile communication system according to an embodiment of the present invention is described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

Overview of Embodiment

A mobile communication method of an embodiment configures a DRX cycle having an On duration in which a downlink signal transmitted from a serving base station is to be monitored and an Off duration other than the On duration in an RRC connected state where an RRC connection is established between a radio terminal and a radio base station. The mobile communication method comprises: a step A of measuring, at the radio terminal, reception quality of a reference signal transmitted from a cell even in the Off duration when the DRX cycle is configured.

According to an embodiment, when a DRX cycle is configured, a radio terminal measures the reception quality of a reference signal transmitted from a cell even in the Off duration. Consequently, even when a very long DRX cycle is configured, the measurement interval of the reception quality of the reference signal is prevented from being increased, and it is possible to appropriately measure and report radio environments.

First Embodiment (Mobile Communication System)

Figure 1:
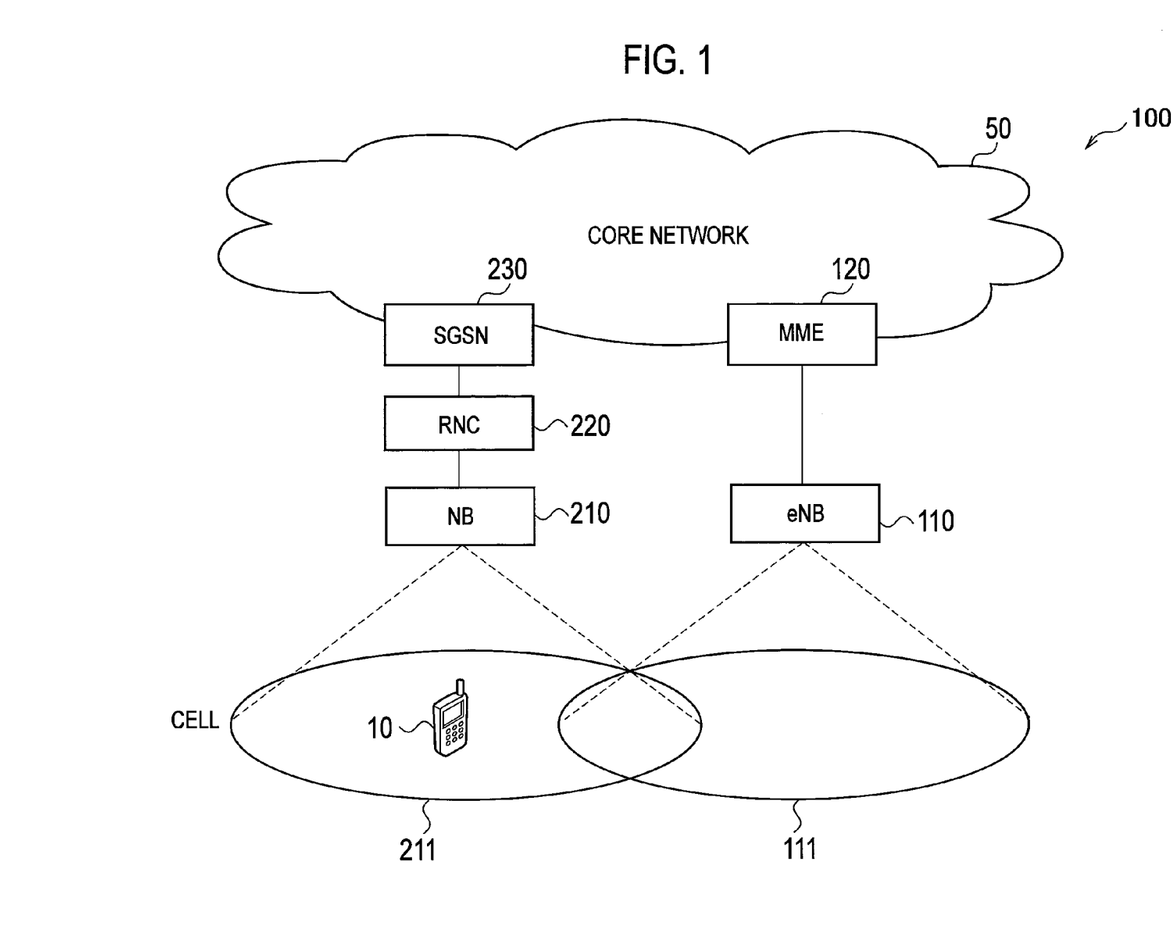
FIG. 1 is a diagram illustrating a mobile communication system 100 according to a first embodiment.

Hereinafter, a mobile communication system according to a first embodiment will be described. FIG. 1 is a diagram illustrating the mobile communication system 100 according to a first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is an LTE (Long Term Evolution)-compatible communication system. The first communication system, for example, includes a radio base station 110 (hereinafter, referred to as eNB 110) and MME 120. In addition, in the first communication system, a first RAT (EUTRAN; Evolved Universal Terrestrial Access Network) is used.

The second communication system, for example, is a WCDMA (Wideband Code Division Multiple Access)-compatible communication system. The second communication system, for example, includes a radio base station 210, RNC 220, and SGSN 230. In addition, in the second communication system, a second RAT (UTRAN; Universal Terrestrial Access Network) is used.

The UE 10 is a device (User Equipment) configured to communicate with the first communication system and the second communication system. For example, the UE 10 has a function of performing radio communication with the eNB 110, and a function of performing radio communication with the radio base station 210.

The eNB 110, having a cell 111, is a device (evolved NodeB) configured to perform radio communication with the UE 10 existing in the cell 111.

The MME 120 is a device (Mobility Management Entity) configured to manage the mobility of the UE 10 which establishes a radio connection with the eNB 110. The MME 120 is provided in the core network 50.

The radio base station 210, having a cell 211, is a device (NodeB) configured to perform radio communication with the UE 10 existing in the cell 211.

The RNC 220, connected to the radio base station 210, is a device (Radio Network Controller) configured to establish a radio connection (RRC Connection) with the UE 10 existing in the cell 211.

The SGSN 230 is a device (Serving GPRS Support Node) configured to perform packet switching in a packet switching domain. The SGSN 230 is provided in the core network 50. Although not illustrated in FIG. 1, a device (MSC; Mobile Switching Center) configured to perform circuit switching in a circuit switching domain may be provided in the core network 50.

Hereinafter, the first communication system will be mainly described. The following description may also be applied to the second communication system. Furthermore, a cell should be understood as a function of performing radio communication with the UE 10. The cell may also be considered as a service area indicating a range communicable with the cell.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is used to transfer a control signal. The control signal, for example, includes CQI (Channel Quality Indictor), PMI (Precoding Matrix Indicator), RI (Rank Indicator), SR (Scheduling Request), and ACK/NACK.

The CQI is a signal for notifying a recommended modulation scheme and a coding rate to be used in downlink transmission. The PMI is a signal indicating a precoder matrix which is preferably used in downlink transmission. The RI is a signal indicating the number of layers (streams) to be used in downlink transmission. The SR is a signal for requesting the assignment of an uplink radio resource (a resource block which will be described later). The ACK/NACK is a signal indicating whether a signal transmitted through the downlink channel (for example, the PDSCH) has been successfully received.

The uplink shared channel is used to transfer a control signal (includes the above-mentioned control signal) and/or a data signal. For example, the uplink radio resource may be assigned only to the data signal, or assigned such that the data signal and the control signal are multiplexed.

The downlink control channel is used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted through the uplink channel.

The downlink shared channel is used to transfer a control signal and/or a data signal. For example, the downlink radio resource may be assigned only to the data signal, or assigned such that the data signal and the control signal are multiplexed.

In addition, a control signal transmitted through the downlink shared channel includes TA (Timing Advance). The TA is transmission timing correction information between the UE 10 and the eNB 110, and is measured by the eNB 110 based on an uplink signal transmitted from the UE 10.

Furthermore, a control signal transmitted through a channel, other than the downlink control channel (the PDCCH) and the downlink shared channel (the PDSCH), includes ACK/NACK. The ACK/NACK is a signal indicating whether a signal transmitted through the uplink channel (for example, the PUSCH) has been successfully received.

(Radio Frame)

Figure 2:
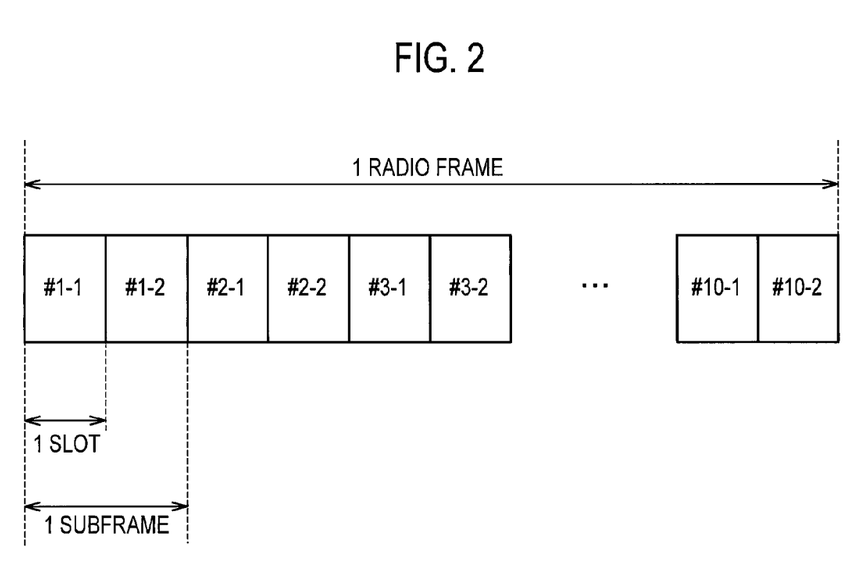
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame includes 10 subframes and one subframe includes two slots. One slot has a time length of 0.5 msec, one subframe has a time length of 1 msec, and one radio frame has a time length of 10 msec.

In addition, one slot includes a plurality of OFDM symbols (for example, six OFDM symbols or seven OFDM symbols) in the downward direction. In the same manner, one slot includes a plurality of SC-FDMA symbols (for example, six SC-FDMA symbols or seven SC-FDMA symbols) in the upward direction.

(Radio Resource)

Figure 3:
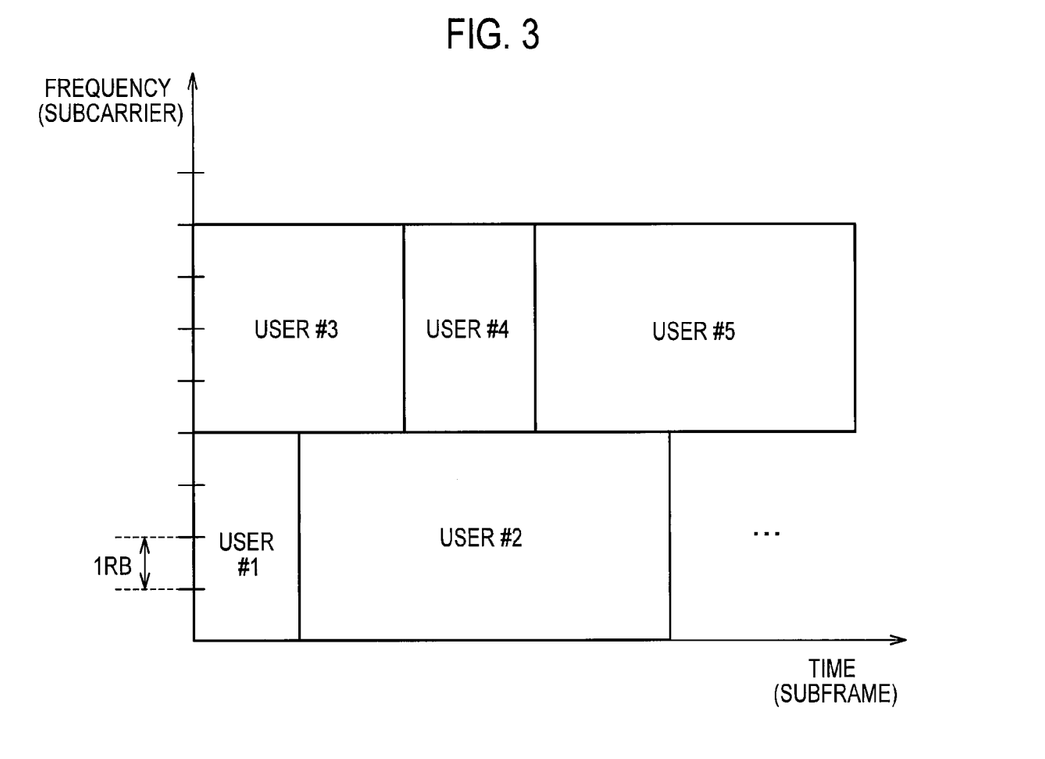
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency includes a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each resource block. Furthermore, on the frequency axis and the time axis, it is possible to divide the radio resources to assign the same to a plurality of users (for example, user #1 to user #5).

Furthermore, the radio resource is assigned by the eNB 110. The eNB 110 assigns the radio resource to each UE 10 based on the CQI, the PMI, the RI and the like.

(Discontinuous Reception)

Figure 4:
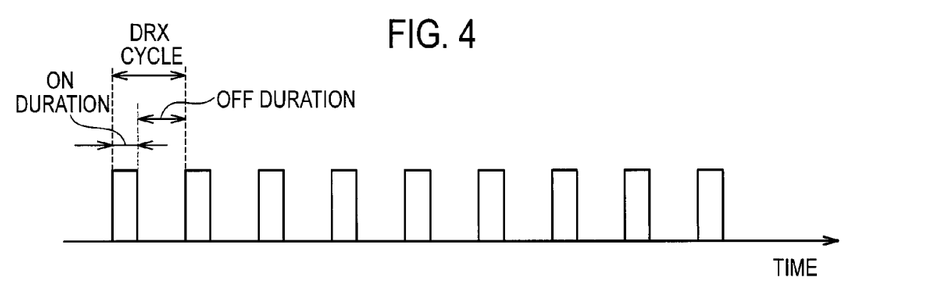
FIG. 4 is a diagram illustrating a short DRX cycle according to the first embodiment.
Figure 5:
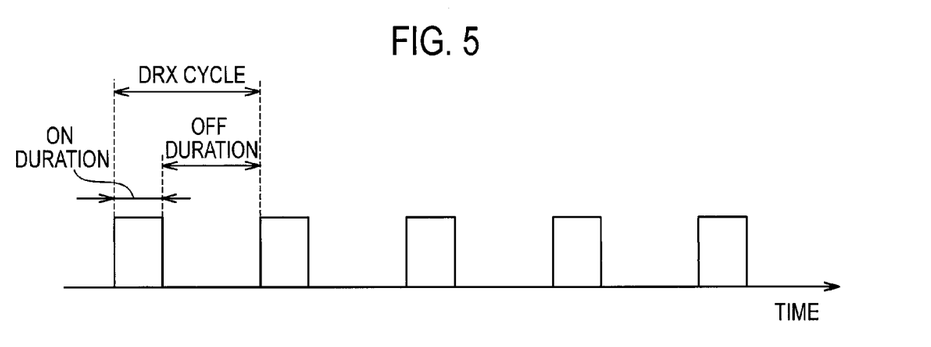
FIG. 5 is a diagram illustrating a long DRX cycle according to the first embodiment.
Figure 6:
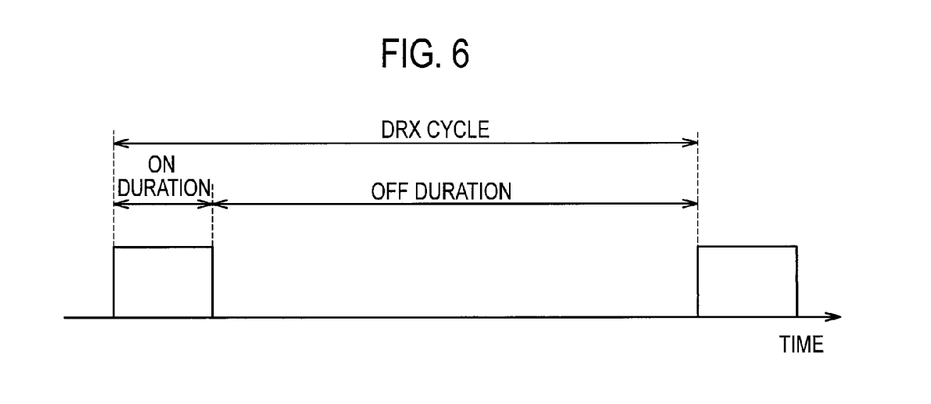
FIG. 6 is a diagram illustrating an extended DRX cycle according to the first embodiment.

Hereinafter, a discontinuous reception (DRX) will be described. FIG. 4 to FIG. 6 are diagrams explaining the discontinuous reception. In order to reduce power consumption, it is possible for the UE 10 to configure the discontinuous reception. Hereinafter, a description will be provided for the case where the discontinuous reception is configured in the state in which an RRC connection is established between the UE 10 and the eNB 110 (an RRC connected state).

As illustrated in FIG. 4 to FIG. 6, according to the discontinuous reception (DRX), a DRX cycle has an On duration, in which a downlink signal transmitted from a serving cell is to be monitored, and an Off duration (Opportunity for DRX) other than the On duration. The eNB 110 transmits a dedicated signal addressed to the UE 10 only in an On duration of the UE 10. As described above, the configuration is such that it suffices to monitor the downlink signal (for example, the PDCCH: Physical Downlink Control Channel), which is transmitted from the eNB 110, only in the On duration, and probably, the UE 10 turns off its own receiver in the Off duration.

In addition, the DRX cycle may include a plurality of types of cycles. Hereinafter, three DRX cycles (a short DRX cycle, a long DRX cycle, and an extended DRX cycle) will be described.

As illustrated in FIG. 4, the short DRX cycle is a short cycle. The length of the short DRX cycle is not particularly limited, and is the order of several milliseconds (for example, 80 msec).

For example, the short DRX cycle is configured according to a command (DRX command) received from the eNB 110. Alternatively, the short DRX cycle is configured when a predetermined period has elapsed after the downlink signal (for example, the PDCCH) is finally received. In addition, since the short DRX cycle is optional, it may not be configured.

As illustrated in FIG. 5, the long DRX cycle is longer than the short DRX cycle. The length of the long DRX cycle is not particularly limited, and is the order of several milliseconds (for example, 160 msec).

For example, when the long DRX cycle is configured, a configuration parameter (DRX Config.) is notified from the eNB 110. The long DRX cycle is configured when a predetermined period has elapsed after the downlink signal (for example, the PDCCH) is finally received. Alternatively, the long DRX cycle is configured when a predetermined period has elapsed after the short DRX cycle is configured.

As illustrated in FIG. 6, the extended DRX cycle is longer than the long DRX cycle. The length of the extended DRX cycle is not particularly limited, and is very longer than the short DRX cycle and the long DRX cycle. For example, the extended DRX cycle is the order of several seconds. For example, the extended DRX cycle is equivalent to a cycle (a Paging Channel Monitoring Cycle), in which a paging signal for notifying that the UE 10 receives an incoming call is monitored, in the state in which the RRC connection has not been established between the UE 10 and the eNB 110 (an RRC idle state). Alternatively, in the RRC idle state, the extended DRX cycle is longer than a cycle in which the paging signal for notifying that the UE 10 receives an incoming call is monitored.

For example, when the extended DRX cycle is configured, a configuration parameter (DRX Config.) is notified from the eNB 110. The extended DRX cycle is configured with the permission of the eNB 110 for a request from the UE 10.

Alternatively, the extended DRX cycle is configured when a predetermined period has elapsed after the downlink signal (for example, the PDCCH) is finally received. Alternatively, the extended DRX cycle is configured when a predetermined period has elapsed after the short DRX cycle or the long DRX cycle is configured. Furthermore, in other examples, the UE 10 may recognize a static configuration parameter in advance, and the extended DRX cycle may also be configured with the permission of the eNB 110 for a request from the UE 10.

In addition, with an increase in the number of UEs 10 having various applications, the transition of an RRC state is increased due to an increase in the transmission/reception of a predetermined message. Therefore, since it is estimated that a shortage of a radio resource such as RACH (Random Access Channel) may be caused, the extended DRX cycle is configured in order to suppress the frequent transition of the RRC state in the UE 10 and to suppress the shortage of the network resource. In addition, the predetermined message includes a message, such as a keep-alive message or a state update message, which is transmitted to a communication correspondent from various applications provided in the UE 10.

(Radio Terminal)

Figure 7:
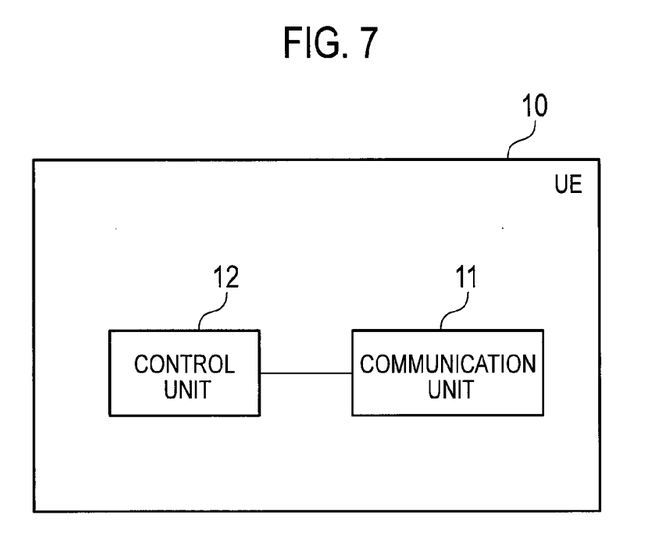
FIG. 7 is a block diagram illustrating UE 10 according to the first embodiment.

Hereinafter, a radio terminal in the first embodiment will be described. FIG. 7 is a block diagram illustrating the UE 10 according to the first embodiment. As illustrated in FIG. 7, the UE 10 includes a communication unit 11 and a control unit 12.

The communication unit 11 receives a signal from the eNB 110 (or the radio base station 210). Alternatively, the communication unit 11 transmits a signal to the eNB 110 (or the radio base station 210). In addition, the communication unit 11, for example, has an antenna (a plurality of antennas when MIMO is used), a demodulation unit, and a modulation unit.

The control unit 12 controls the UE 10. For example, when the discontinuous reception (DRX) is configured, the control unit 12 controls the on/off of the communication unit 11. That is, in the On duration in which the downlink signal transmitted from the serving cell is to be monitored, the control unit 12 turns on the communication unit 11 and monitors the downlink signal (for example, the PDCCH) transmitted from the eNB 110. In the Off duration other than the On duration in which the downlink signal transmitted from the serving cell is to be monitored, the control unit 12 turns off the communication unit 11 and does not monitor the downlink signal (for example, the PDCCH) transmitted from the eNB 110.

Specifically, when the DRX cycle is configured, the control unit 12 measures the reception quality of the reference signal transmitted from the cell even in the Off duration. Specifically, in the Off duration, the control unit 12 measures the reception quality of a reference signal transmitted from a serving cell to which the UE 10 is connected. Alternatively, in the Off duration, the control unit 12 measures the reception quality of a reference signal transmitted from an adjacent cell (hereinafter, referred to as an Intra-Frequency neighboring cell) other than the serving cell, which uses a frequency band the same as that of the serving cell. Needless to say, in the Off duration, the control unit 12 may also measure the reception qualities of the reference signals transmitted from both the serving cell and the Intra-Frequency neighboring cell.

Furthermore, when the DRX cycle is configured, the control unit 12 measures the reception quality of the reference signal transmitted from the cell in the On duration. Specifically, in the On duration, the control unit 12 measures the reception quality of the reference signal transmitted from the serving cell, to which the UE 10 is connected, or the Intra-Frequency neighboring cell. Alternatively, before entering the DRX mode, when a configuration of a measurement gap duration to be configured in the On duration is notified from the eNB 110, the control unit 12 measures the reception quality of a reference signal transmitted from an adjacent cell (Inter-Frequency) other than the serving cell, which uses a frequency band different from that of the serving cell, in the measurement gap duration determined by the configuration notified from the eNB 110. Needless to say, in the On duration, the control unit 12 may also measure the reception qualities of the reference signals transmitted from both the serving cell and the Inter-Frequency neighboring cell.

Here, when the reception quality of the reference signal transmitted from the serving cell or the Intra-Frequency adjacent cell in the On duration and/or the reception quality of the reference signal transmitted from the Inter-Frequency adjacent cell in the measurement gap duration satisfy a predetermined condition, the control unit 12 may also perform a process for measuring the reception quality of the reference signal in the Off duration. In addition, the predetermined condition, for example, includes as follows:

(1) the reception quality of the reference signal received from the serving cell becomes less than a first threshold value;

(2) the reception quality of the reference signal received from the adjacent cell (Intra-Frequency or Inter-Frequency) exceeds a second threshold value;

(3) reception quality obtained by adding a predetermined offset to the reception quality of the reference signal received from the adjacent cell (Intra-Frequency or Inter-Frequency) exceeds the second threshold value; and (4) the reception quality of the reference signal received from the serving cell becomes less than the first threshold value and the reception quality of the reference signal received from the adjacent cell (Intra-Frequency or Inter-Frequency) exceeds the second threshold value.

In addition, it is preferable that the measurement timing of the reception quality of the reference signal is uniformly assigned in the Off duration. Furthermore, it is preferable that information (Cell ID), which indicates a cell for transmitting a reference signal to be measured in the Off duration, is notified from the eNB 110 to the UE 10.

When a transmission condition of a measurement result is satisfied, the control unit 12 transmits the measurement result (the above-mentioned the CQI, the PMI, the RI and the like) of the reception quality of the reference signal to the eNB 110. For example, the control unit 12 transmits the measurement result of the reception quality of the reference signal to the eNB 110 through the uplink control channel (PUCCH).

(Mobile Communication Method)

Hereinafter, the mobile communication method according to the first embodiment will be described. FIG. 8 to FIG. 11 are sequence diagrams illustrating the mobile communication method according to the first embodiment. In addition, in FIG. 8 to FIG. 11, the same reference numerals are applied to the same processes.

Firstly, a first pattern will be described with reference to FIG. 8. In addition, in FIG. 8, the eNB 110 is a radio base station having a serving cell to which the UE 10 is connected.

Figure 8:
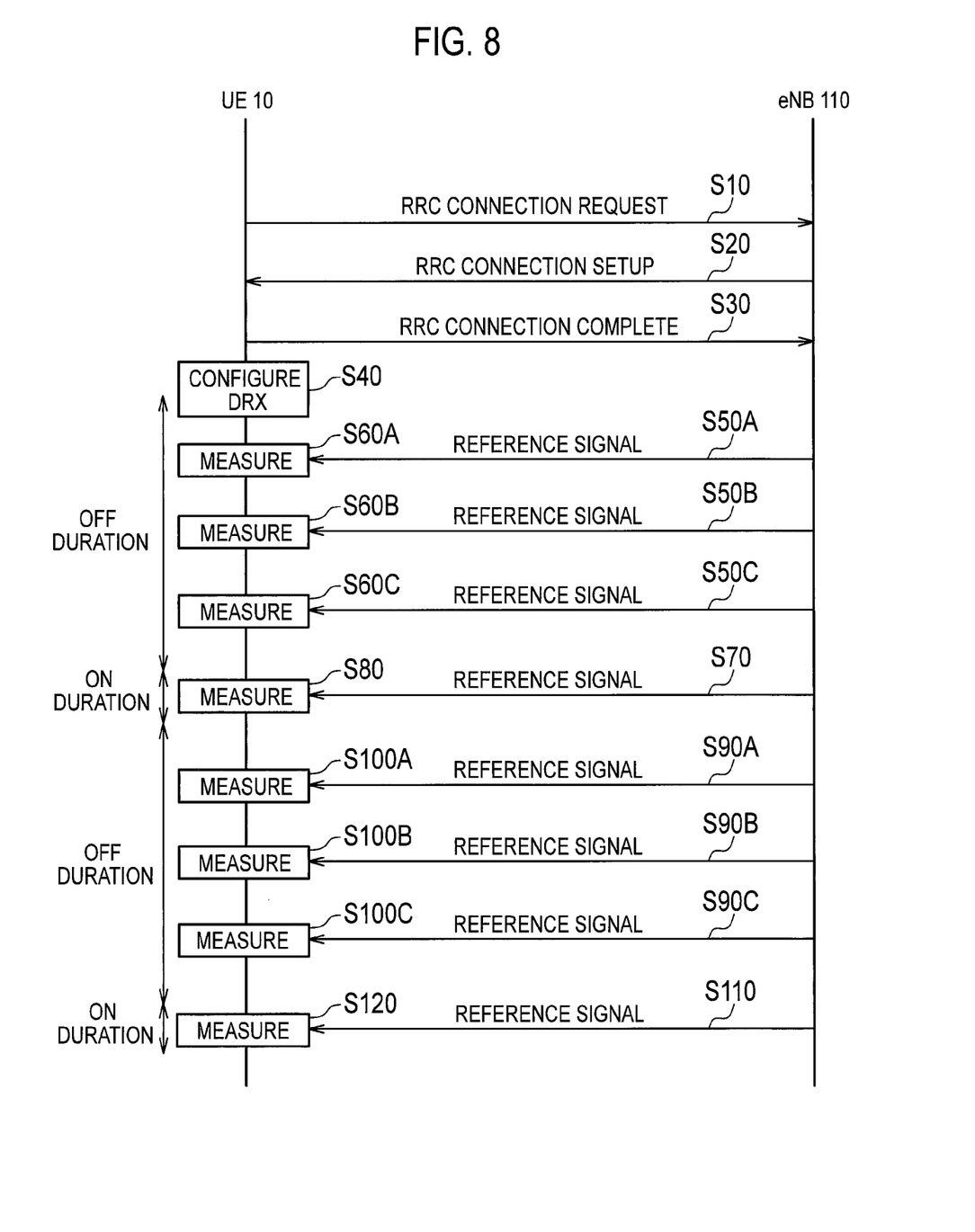
FIG. 8 is a sequence diagram illustrating a mobile communication method according to the first embodiment.

As illustrated in FIG. 8, in step 10, the UE 10 transmits a connection request (RRC Connection Request) to the eNB 110.

In step 20, the eNB 110 transmits a connection setup (RRC Connection Setup) to the UE 10.

In step 30, the UE 10 transmits a connection complete (RRC Connection Complete) to the eNB 110.

In step 40, the UE 10 configures DRX. For example, the UE 10 configures an extended DRX cycle.

In step 50A to step 50C, the eNB 110 transmits a reference signal.

In step 60A to step 60C, the UE 10 measures the reception quality of the reference signal, which is transmitted from the eNB 110 (that is, the serving cell), even in a duration (that is, an Off duration) other than an On duration in which a downlink signal transmitted from the serving cell is to be monitored.

Here, in order to clarify the description, FIG. 8 illustrates that the eNB 110 transmits the reference signal at the timing (the measurement timing) at which the UE 10 measures the reception quality of the reference signal. However, the embodiment is not limited thereto. That is, it is of course that the eNB 110 transmits the reference signal regardless of the measurement timing of the UE 10.

In addition, it should be noted that timings of step 60A to step 60C are uniform in the Off duration.

In step 70, the eNB 110 transmits a reference signal.

In step 80, the UE 10 measures the reception quality of the reference signal, which is transmitted from the eNB 110 (that is, the serving cell), in the On duration.

In step 90A to step 90C, the eNB 110 transmits a reference signal.

In step 100A to step 100C, the UE 10 measures the reception quality of the reference signal, which is transmitted from the eNB 110 (that is, the serving cell), even in the Off duration.

In addition, it should be noted that timings of step 100A to step 100C are uniform in the Off duration, similarly to step 60A to step 60C.

In step 110, the eNB 110 transmits a reference signal.

In step 120, the UE 10 measures the reception quality of the reference signal, which is transmitted from the eNB 110 (that is, the serving cell), in the On duration.

Secondly, a second pattern will be described with reference to FIG. 9. In addition, in FIG. 9, the eNB 110 is a radio base station having a serving cell to which the UE 10 is connected. Hereinafter, a difference from the first pattern will be mainly described.

Figure 9:
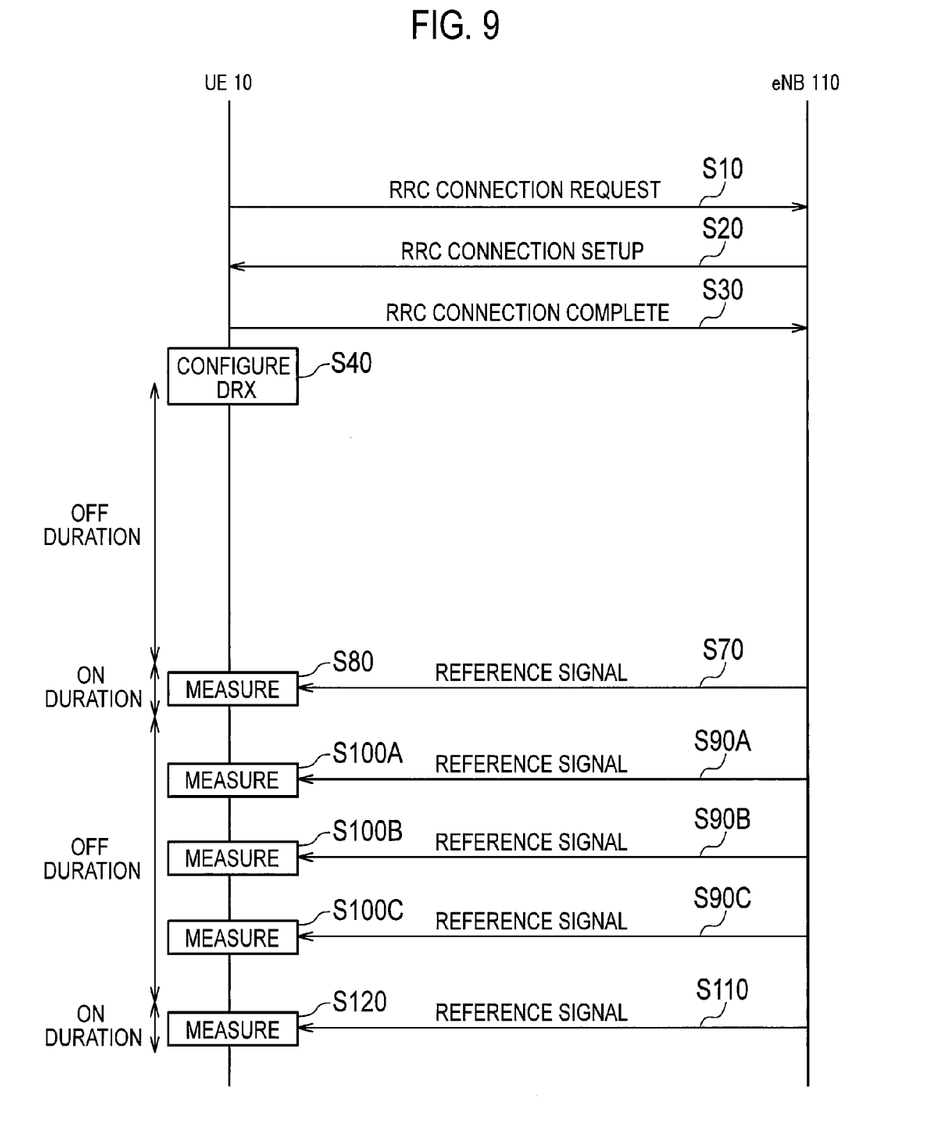
FIG. 9 is a sequence diagram illustrating the mobile communication method according to the first embodiment.

As illustrated in FIG. 9, in the second pattern, step 50A to step 50C and step 60A to step 60C are omitted.

In step 80, the UE 10 measures the reception quality of the reference signal, which is transmitted from the eNB 110 (that is, the serving cell), in the On duration. Here, it is assumed that the reception quality of the reference signal transmitted from the serving cell satisfies a predetermined condition. The predetermined condition, for example, includes as follows:

(1) the reception quality of the reference signal received from the serving cell becomes less than a first threshold value;

Thirdly, a third pattern will be described with reference to FIG. 10. In addition, in FIG. 10, an eNB 110A is a radio base station having a serving cell to which the UE 10 is connected, and an eNB 110B is a radio base station having an adjacent cell (Intra-Frequency or Inter-Frequency) other than the serving cell. In addition, the eNB 110A and the eNB 110B may be the same radio base station. Hereinafter, a difference from the first pattern will be mainly described. In addition, the transmission of reference signals from the eNB 110A and the eNB 110B and the measurement of the UE 10, which are indicated by the same step numbers, may be performed at different subframes.

Figure 10:
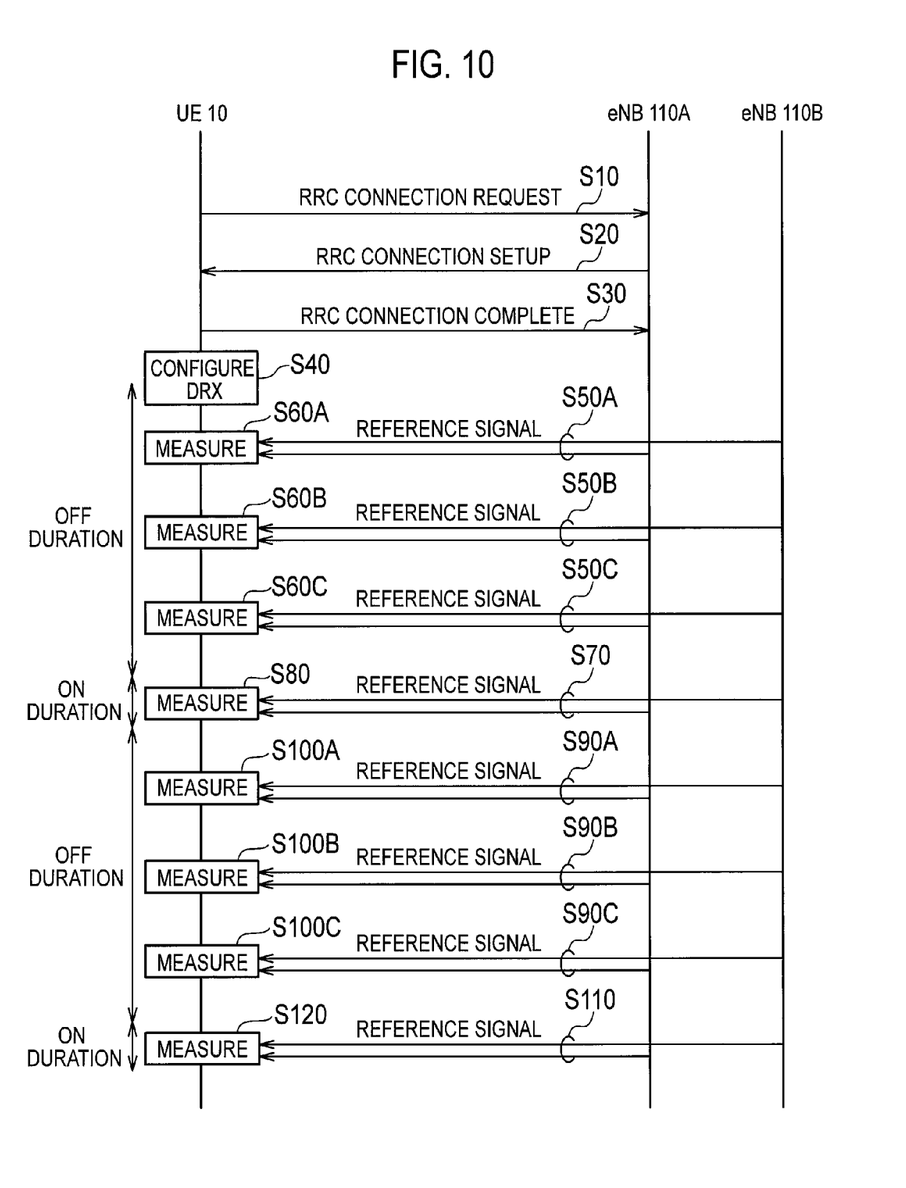
FIG. 10 is a sequence diagram illustrating the mobile communication method according to the first embodiment.

In the third pattern, as illustrated in FIG. 10, in step 50A to step 50C, step 80, step 100A to step 100C, and step 120C, the UE 10 measures the reception qualities of the reference signals transmitted from the eNB 110A (that is, a serving cell) and the eNB 110B (that is, a neighboring cell).

Fourthly, a second pattern will be described with reference to FIG. 11. In addition, in FIG. 11, an eNB 110 is a radio base station having a serving cell to which the UE 10 is connected. An eNB 110A is a radio base station having a serving cell to which the UE 10 is connected, and an eNB 110B is a radio base station having an adjacent cell (Intra-Frequency or Inter-Frequency) other than the serving cell. In addition, the eNB 110A and the eNB 110B may be the same radio base station. Hereinafter, a difference from the third pattern will be mainly described.

Figure 11:
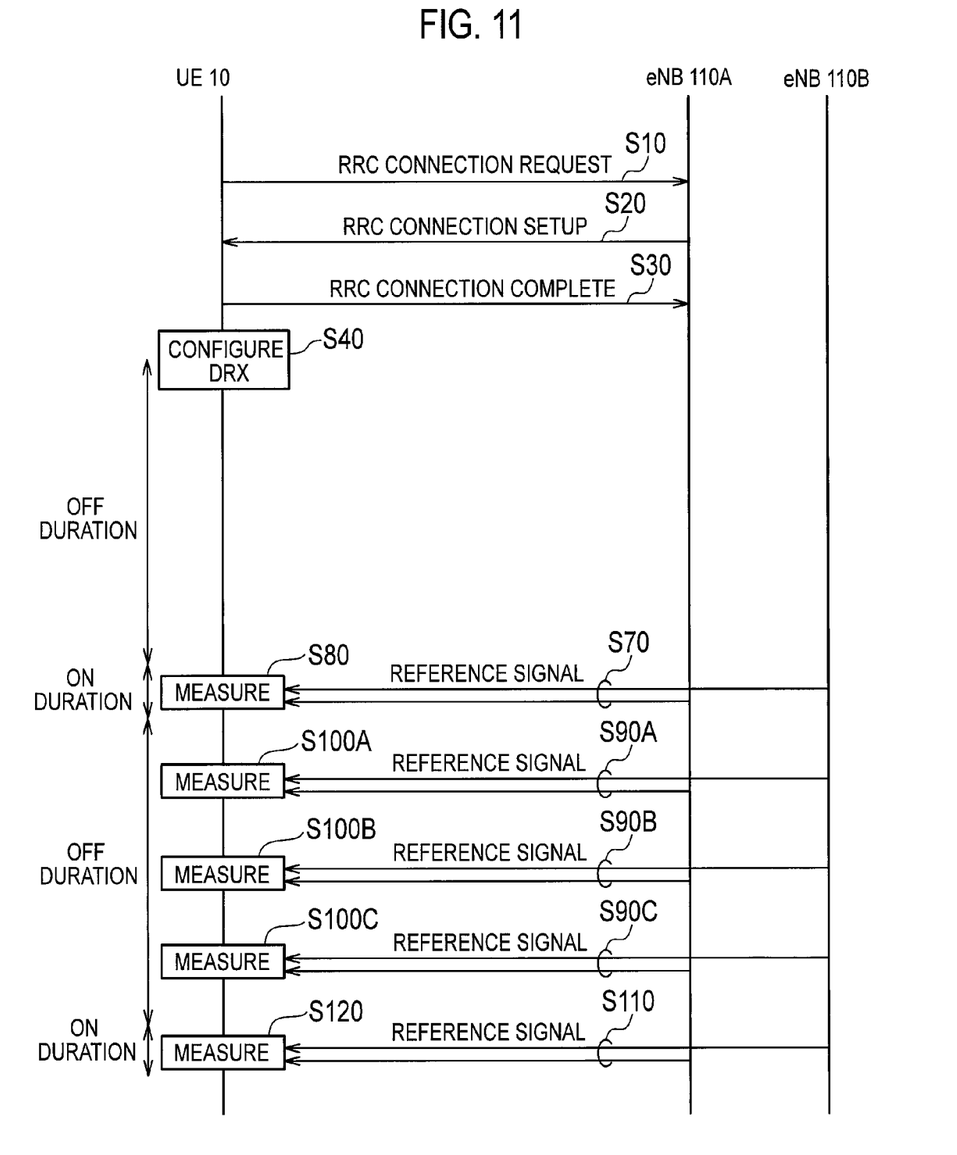
FIG. 11 is a sequence diagram illustrating the mobile communication method according to the first embodiment.

As illustrated in FIG. 11, in the second pattern, step 50A to step 50C and step 60A to step 60C will be omitted.

In step 80, the UE 10 measures the reception qualities of the reference signals, which are transmitted from the eNB 110A (that is, the serving cell) and the eNB 110B (that is, the neighboring cell), in the On duration. Here, it is assumed that the reception qualities of the reference signals transmitted from the serving cell and the adjacent cell satisfy predetermined condition. The predetermined condition, for example, includes as follows:

(2) the reception quality of the reference signal received from the adjacent cell (Intra-Frequency or Inter-Frequency) exceeds a second threshold value;

(3) reception quality obtained by adding a predetermined offset to the reception quality of the reference signal received from the adjacent cell (Intra-Frequency or Inter-Frequency) exceeds the second threshold value; and (4) the reception quality of the reference signal received from the serving cell becomes less than the first threshold value and the reception quality of the reference signal received from the adjacent cell (Intra-Frequency or Inter-Frequency) exceeds the second threshold value.

(Operation and Effect)

According to the first embodiment, when the DRX cycle is configured, even in the duration (that is, the Off duration) other than the On duration in which the downlink signal transmitted from the serving cell is to be monitored, the UE 10 measures the reception quality of the reference signal transmitted from the cell. Consequently, even when a very long DRX cycle is configured, the measurement interval of the reception quality of the reference signal is prevented from being increased, so that it is possible to appropriately measure and report radio environments.

Specifically, when an extended DRX cycle having a very long DRX cycle is configured, it is effective to measure the reception quality of the reference signal in the Off duration of the extended DRX cycle.

First Modification

Hereafter, a first modification of the first embodiment is explained. In the first modification, a difference from the first embodiment will be mainly described.

According to the first modification, a description will be provided for the case in which the mobile communication system 100 supports an SON (Self Organization Network) function. In other words, a description will be provided for the case in which the UE 10 and the eNB 110 support the SON function.

When there occurs an event (hereinafter, referred to as RLF; Radio Link Failure) that a radio connection is not normal and is interrupted, the UE 10 holds the factor and the like of the RLF as a report (hereinafter, referred to as an RLF report). If the UE 10 transitions to an RRC connected state, the UE 10 notifies the eNB 110, to which an RRC connection is set, of the fact that the UE 10 holds the RLF report.

The eNB 110 requests, to the UE 10, the RLF report in response to the notification indicating that the UE 10 holds the RLF report, and receives the RLF report from the UE. In addition, the RLF report is used to set a parameter (hereinafter, referred to as a handover parameter) for determining a handover condition.

In such a case, when the above-mentioned extended DRX cycle is configured, the frequency, by which the UE 10 receives a reference signal, is reduced, and the RLF may occur regardless of the setting of an appropriate handover parameter. In such a case, if the RLF report is collected, the appropriate handover parameter may be changed, resulting in the setting of an inappropriate handover parameter.

Thus, in a second modification, when the RLF occurs in the state in which the extended DRX cycle is configured, the UE 10 performs the following operations:

(1-1) the UE 10 does not notify the eNB 110 of the fact that the UE 10 holds the RLF report;

(1-2) the UE 10 notifies the eNB 110 of the fact that the UE 10 holds the RLF report and the fact that the extended DRX cycle is configured. In other words, the UE 10 adds the notification, which indicates that the extended DRX cycle is configured, to the notification indicating that the UE 10 holds the RLF report; and (1-3) the UE 10 notifies the eNB 110 of the RLF report and the fact that the extended DRX cycle is configured. In other words, the UE 10 adds the notification, which indicates that the extended DRX cycle is configured, to the RLF report.

Furthermore, in the second modification, when the RLF occurs in the state in which the extended DRX cycle is configured, the eNB 110 performs the following operation:

(2-1) when the notification, which indicates that the UE 10 holds the RLF report and the notification, which indicates that the extended DRX cycle is configured, is received, the eNB 110 does not request the RLF report to the UE 10. That is, the eNB 110 does not collect the RLF report.

When the eNB 110 has recognized the fact that the extended DRX cycle is configured, for example, when the extended DRX cycle is configured in the UE 10 having an RRC connection with the eNB 110, the notification, which indicates that the extended DRX cycle is configured, is not essential.

Other Embodiments

The present invention is explained through the above embodiment, but it must not be understood that this invention is limited by the statements and the drawings constituting a part of this disclosure. From this disclosure, a variety of alternate embodiments, examples, and applicable techniques will become apparent to one skilled in the art.

Particularly not mentioned in the embodiment, but a configuration for measuring the reception quality of the reference signal in the duration (that is, the Off duration) other than the On duration, in which a downlink signal transmitted from the serving cell is to be monitored, is transmitted from the eNB 110 to the UE 10 before the DRX cycle is configured. A configuration for measuring the reception quality of the reference signal in the Off duration, for example, includes conditions (for example, the above-mentioned predetermined conditions (1) to (4), specifically, the predetermined offset) for measuring the reception quality of the reference signal, a measurement cycle for measuring the reception quality of the reference signal, and information indicating a cell for transmitting a reference signal to be measured in the Off duration. A configuration for measuring the reception quality of the reference signal in the Off duration, for example, may be notified to the UE 10 through RRC signaling, or may be notified to the UE 10 through a broadcast channel. The broadcast channel is broadcasted from the eNB 110 and transfers MIB (Master Information Block) or SIB (System Information Block).

According to an example, when a DRX cycle (specifically, an extended DRX cycle) is configured, there is considered a case in which a setting request of the DRX cycle is transmitted from the UE 10 to the eNB 110 and setting permission of the DRX cycle is transmitted from the eNB 110 to the UE 10. In such a case, it is considered that a configuration for measuring the reception quality of the reference signal in the Off duration is included in the setting permission transmitted from the eNB 110 to the UE 10.

According to other embodiments, when the reception quality of the reference signal transmitted from the cell satisfies a predetermined condition, the UE 10 may request the eNB 110 to change the DRX cycle, resulting in an increase in the number of measurements of the reception quality of the reference signal.

According to other embodiments, separately from an existing measurement gap, a new measurement gap for measuring radio environments of the serving cell and a base station, which is operated with a frequency the same as that of the serving cell, may be defined, and then the reception quality of the reference signal may be measured in the new measurement gap.

Furthermore, similarly to the first embodiment, only when a condition with predetermined reception quality is satisfied, the UE 10 may measure the reception quality based on the configuration of the new measurement gap at that point in time, in addition to the previously performed measurement of reception quality.

What is claimed is:

1. A mobile communication method, which configures a discontinuous reception (DRX) cycle having an On duration in which a downlink signal transmitted from a serving base station is to be monitored and an Off duration in which a receiver of radio terminal is turned off in a radio resource control (RRC) connected state where an RRC connection is established between a radio terminal and a radio base station, the mobile communication method comprising:

a step A of measuring, at the radio terminal, reception quality of a reference signal transmitted from a cell even in the Off duration when the DRX cycle is configured; and a step B of measuring, at the radio terminal, reception quality of a reference signal, which is transmitted from an adjacent cell other than a serving cell of the serving base station using a frequency band same as a frequency band of the serving cell, in the On duration, or reception quality of a reference signal, which is transmitted from an adjacent cell other than the serving cell using a frequency band different from a frequency band of the serving cell, in a measurement gap duration configured in the On duration, wherein, the radio terminal performs the step A when the reception quality measured in the step B satisfies a predetermined condition.

2. The mobile communication method according to claim 1, wherein step B includes measuring, at the radio terminal, reception quality of a reference signal, which is transmitted from a serving cell to which the radio terminal is connected, in the On duration.

3. The mobile communication method according to claim 1, wherein the step A comprises: a step of measuring, at the radio terminal, reception quality of a reference signal, which is transmitted from a serving cell to which the radio terminal is connected or an adjacent cell other than the serving cell.

4. The mobile communication method according to claim 1, comprising:
a step C of receiving, at the radio terminal, information indicating a cell which transmits a reference signal to be measured in the Off duration from the radio base station.

5. The mobile communication method according to claim 1, wherein a measurement timing of the reception quality of the reference signal in the step A is uniformly assigned in the Off duration.

6. A radio terminal configured to receive a downlink signal in a mobile communication system, which configures a discontinuous reception (DRX) cycle having an On duration in which the downlink signal transmitted from a serving base station is to be monitored and an Off duration in which a receiver of radio terminal is turned off in a radio resource control (RRC) connected state where an RRC connection is established between the radio terminal and a radio base station, the radio terminal comprising:
a control unit configured to measure reception quality of a reference signal transmitted from a cell even in the Off duration when the DRX cycle is configured, and configured to measure reception quality of a reference signal transmitted from an adjacent cell other than a serving cell of the serving base station using a frequency band same as a frequency band of the serving cell, in the On duration, or reception quality of a reference signal transmitted from an adjacent cell other than the serving cell using a frequency band different from a frequency band of the serving cell, in a measurement gap duration configured in the On duration,
wherein, the radio terminal performs the measurement of the reception quality of the reference signal transmitted from a cell even in the Off duration when the reception quality measured in the On duration satisfies a predetermined condition.

7. The mobile communication method according to claim 1, wherein, in the step A, the radio terminal measures reception quality of a reference signal transmitted from a serving cell to which the radio terminal is connected, even in the OFF duration when the DRX cycle is configured.

8. The radio terminal according to claim 6, wherein the controller measures reception quality of a reference signal transmitted from a serving cell to which the radio terminal is connected, even in the OFF duration when the DRX cycle is configured.

9. The radio terminal according to claim 6, wherein the controller measures, in the On duration, the reception quality of a reference signal transmitted from the serving cell to which the radio terminal is connected.

* * * * *